Figure 1:
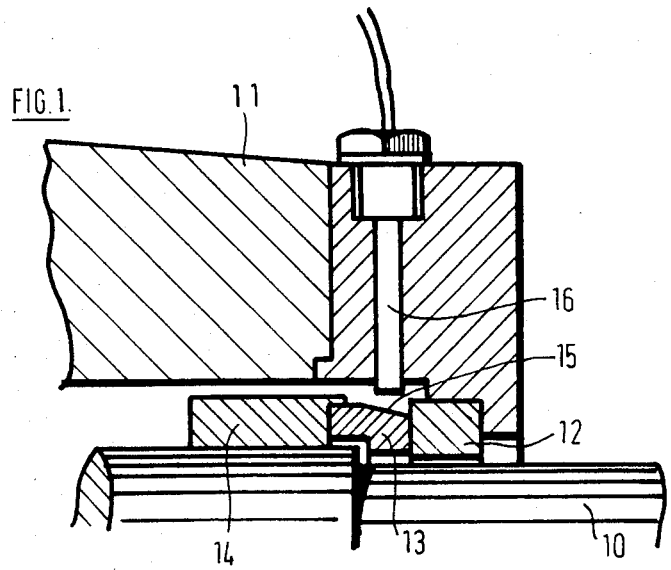

United States Patent [19]
Sall et al.

[11] Patent Number: 4,497,493
[45] Date of Patent: Feb. 5, 1985

[54] MECHANICAL FACE SEALS WITH WEAR MONITOR MEANS

[75] Inventors: Surinderpal S. Sall, Slough; John Kemp, Franham Common, both of England

[73] Assignee: Crane Packing Limited, Slough, England

[21] Appl. No.: 629,813

[22] Filed: Jul. 11, 1984

[30] Foreign Application Priority Data

Jul. 20, 1983 [DE] Fed. Rep. of Germany ....... 8319550

[51] Int. Cl.³ .............................................. F16J 15/34
[52] U.S. Cl. .................................... 277/2; 277/81 R; 277/237 R
[58] Field of Search ..................... 277/1, 2, 81 R, 237; 73/37.5, 104

[56] References Cited

U.S. PATENT DOCUMENTS 4,424,973  1/1984  Heilala .................................... 277/2

FOREIGN PATENT DOCUMENTS

| 3135275 | 3/1983 | Fed. Rep. of Germany | 277/2 |
| 54-117852 | 9/1979 | Japan | 277/2 |
| 976166 | 11/1982 | U.S.S.R. | 277/2 |
| 976172 | 11/1982 | U.S.S.R. | 277/2 |

Primary Examiner—Robert S. Ward
Attorney, Agent, or Firm—Kemon & Estabrook

[57] ABSTRACT

A method of monitoring the wear of the sealing faces of a mechanical face seal comprising; positioning a probe radially of the axially moveable seal face member of the seal or a component which moves axially with the seal face member; producing a signal which is directed radially outwardly from the surface of the seal face member or component so that it may be picked up by the probe; and arranging the surface of the seal face member or component such that there is a change in signal, indicative of the wear on the sealing faces, as the seal face member moves axially with respect to the probe.

13 Claims, 2 Drawing Figures

MECHANICAL FACE SEALS WITH WEAR MONITOR MEANS

This invention relates to seals and in particular to means for monitoring the wear of the sealing faces of mechanical face seals.

In a mechanical face seal, the rubbing faces of the opposed sealing elements are subjected to wear. One of these elements, the seal face member, is consequently mounted with respect to the component with which it is associated, so that it is able to move axially towards the other elements, the seat, so that as wear occurs the faces of the two elements may be maintained in sealing engagement. There is, of course, a limit to the degree of wear that may be accommodated and it is consequently desirable to monitor the wear of the faces of the sealing elements, so that they can be replaced when a certain wear limit is reached and before the seal fails.

One method by which the seal wear may be monitored, is to use a probe to measure the axial distance of a radial surface associated with the axially movable seal face element from a fixed point. However, because of dimensional constraints, particularly with smaller diameter seals, this method is not always convenient.

According to one aspect of the present invention, a method of monitoring the wear of the sealing faces of a mechanical face seal having an axially fixed seat and an axially movable seal face member which is urged into sealing engagement with said seat, comprises positioning a sensor radially of said seal face member or a component which moves axially with the seal face member, such that it may detect a signal from a radially opposed surface of the seal face member or component, said surface of the seal face member or component being arranged to provide a change in signal as the seal face member moves axially with respect to the sensor, thereby indicating the wear limit or the amount of wear of the sealing faces.

According to a further aspect of the present invention, a mechanical face seal comprises an axially fixed seat and an axially movable seal face member which is urged into sealing engagement with said seat, a sensor is mounted radially of the seal face member or a component which moves axially with the seal face member and means is provided for producing a signal directed radially from the surface of the seal face member or component to the sensor, said surface of the seal face member or component being arranged to produce a change in signal indicative of the wear limit or amount of wear of the sealing faces.

The probe may be an inductive probe in which, for example, a suitable frequency alternating magnetic field is produced by the probe and this magnetic field induces eddy currents in the opposed portion of the seal face member or associated component, these eddy currents in turn producing a magnetic field which modifies the field produced by the probe, providing a signal indicative of the degree of interaction of the fields. With this form of probe, the seal face member which is electrically conductive or semi-conductive, or an electrically conductive or semi-conductive member which moves axially with the seal face member, for example, a carrier ring, may be profiled so that as the seal face member or associated component moves axially past the probe as the seal faces wear, the radial gap between the probe and opposed cylindrical surface will vary causing a variation in the signal measured by the probe. The surface of the seal face member or associate component may be chamfered, so that variation in the radial gap and signal will be progressive, or may form a step so that there will be an incremetal change in the gap and signal, when for example, the wear limit is reached.

Alternatively, when the seal face member is made of non-conductive material, a conductive or semi-conductive insert may be implanted in the seal face member to define, for example, the wear limit, so that a indication that the wear limit has been reached will be given when a signal is produced at the probe. A variation of this arrangement would be to use a probe with pick up means only and use a magnetic insert.

The probe may alternatively be optical, having for example, optical fibers by means of which light may be transmitted from a light source and directed onto the outer cylindrical surface of the seal face member or associated component and the reflected light transmitted to a suitable sensing means. With optical probes, the opposed surface of the seal face member or associated component may be profiled in the same manner as those used with inductive probes. However, with the optical probe it is preferred that the surface is stepped, so as to give an instantaneous change in the reflected light when the wear limit is reached. This form of optical probe relies on the variation in light scattering with variation in the radial gap. Alternatively, the gap between the probe and the opposed surface may remain constant, the opposed surface being treated so that it is of variable reflectivity, depending on the relative axial position of the seal face member or associated component with respect to the probe. For example, a band of reflective material may be mounted on the surface of the seal face member opposite the probe, the band tapering away from the wear limit so that it covers an increasing circumference of the seal face member until at the wear limit it extends around the full circumference. In this manner, as the band rotates past the probe, it will give an increasing intensity of reflection, as the seal face member approaches the wear limit.

Figure 2:
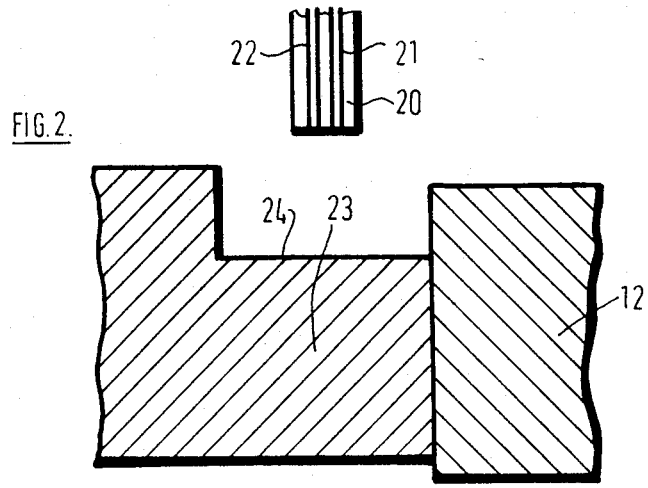

The invention is now described by way of example only, with reference to the accompanying drawings, in which:

FIG. 1 illustrates a typical mechanical face seal with wear monitoring means in accordance with the present invention; and FIG. 2 illustrates an alternative arrangement of probe and seal face member, for use in a seal of the form illustrated in FIG. 1.

As illustrated in FIG. 1, a typical mechanical face seal between a shaft 10 and housing 11 comprises a seat 12 which is mounted in a recess in the housing 11 and is sealed thereto. A seal face member 13 is mounted on the shaft 10 so that it is movable axially thereof and rotatable therewith. Suitable conventional means 14, for example, an elastomeric bellows and compression springs serve to urge the seal face member 13 into sealing engagement with the seat 12 and to provide a secondary seal between the seal face member 13 and the shaft 10. The outer circumferential surface of the seal face member 13 is provided with a conical chamfer 15. An inductive probe 16 is mounted in the wall of the housing 11 opposite to the conical surface 15 of the seal face member 13. This probe 16 comprises a coil which is energised to produce a suitable frequency alternating magnetic field. The seal face member 13 is made of electrically conductive material, for example, carbon or sintered metal, and the high frequency alternative magnetic field induces eddy currents in the seal face member 13. These eddy currents in turn produce a magnetic field which tends to damp that produced by the coil of the probe 16. The degree of damping increasing as the gap reduces between the probe 16 and the opposed conical surface 15 of the seal face member 13. As a result, the current used to energise the coil in the probe 16 can be increased to maintain a constant field strength. The variation in current used to energise the coil may, therefore, be used to give a signal indicative of the radial gap between the probe 16 and surface 15 of the seal face member 13. As the sealing faces of the seal face member 13 and seat 12 wear, the seal face member 13 will move towards seat 12 and consequently the radial gap between the probe 16 and the conical surface 15 will reduce and the signal produced by the probe will vary accordingly. Hence, the probe 16 may be used to give an indication of the axial movement of the seal face member 13 and hence the wear of the sealing faces.

In this embodiment, the probe may be arranged to provide a warning when a specified change in the gap between the probe 16 and surface 15 has occurred and the sealing elements of the seal require replacement. The system could also be arranged to give advanced warnings, before the wear limit has actually been reached.

The probe 16 will also detect any eccentricity in the rotation of the seal face member 13. This will produce an oscillating variation in the signal from the probe 16, as opposed to the linear variation due to seal wear. These signals can consequently be differentiated, using suitable electronics, and the probe may be used to monitor both eccentricity and wear.

In the alternative embodiment illustrated in FIG. 2, the probe 20 is optical, having a pair of optical fibres 21, 22. One of these fibres transmits a beam of light from a suitable source (not shown) while the other transmits a light reflected from the opposing surface of the seal face member 23, to a suitable sensing means, for example, a photoelectric diode. In this embodiment, the surface 24 of the seal face member 23 opposed to the probe 20 is of stepped configuration. The step may be provided particularly for the purpose, although on balanced seal face members, the step provided for balancing purposes may also be used for this purpose.

In operation, because of scattering of the light between the probe 20 and surface 24 of the seal face member 23, reflected light detected by the probe 20 will be of relatively low intensity, until the step reaches the probe 20, when there will be a sharp increase in intensity. This increase in intensity may be enhanced by treating the surface 24 of the seal face member 23, so that the portion with greater outside diameter has a greater reflectivity than the portion with smaller diameter. By positioning the probe 20, so that the shoulder of the step will be in line with the probe 20, when the sealing elements have reached their wear limit, the probe 20 may be arranged to indicate that replacement of the seal face member 23 and seat 12 is required. This arrangement again may also be used to monitor eccentricity of the seal face member.

Various modifications may be made without departing from the invention. For example, the step configuration may be used with an inductive type probe or the chamfer configuration with an optical probe. A profile having several steps may also be used to give progressive indications of the wear of the sealing elements. The probes may also include other sensors, for example, thermometers and pressure sensing means, by means of which the environment of the sealing elements may also be monitored.

We claim:

1. A method of monitoring the wear of the sealing faces of a mechanical face seal having an axially fixed seat and an axially movable seal face member which is urged into sealing engagement with said seat; comprising positioning a sensor radially of said seal face member or a component which moves axially with the seal face member, such that it may detect a signal from a radially opposed surface of the seal face member or component, said surface of the seal face member or component being arranged to provide a change in signal as the seal face member moves axially with respect to the sensor, thereby indicating the wear limit or the amount of wear of the sealing faces.

2. A method according to claim 1 in which the signal is reflected from the surface of the seal face member or component, radially opposed to the sensor.

3. A method according to claim 2 in which a probe having a transmitter and sensor is mounted in the seal housing, radially opposed to the seal face member or component.

4. A method according to claim 1 in which the surface of the seal face member or component is contoured, such that the gap between the surface thereof and the sensor varies to produce a variation in the amplitude of the signal as the sealing faces wear and the seal face member moves axially.

5. A method according to claim 4 in which the surface of the seal face member or component is chamfered so that there is a progressive change in the signal as the seal face member moves axially.

6. A method according to claim 4 in which the surface of the seal face member or component is stepped, the step being positioned relative to the sensor such that there is an incremental change in the signal as the wear limit of the sealing faces is reached.

7. A method according to claim 1 in which the seal face member or component is made of conductive or semi-conductive material, one or more electromagnetic transducers being used to transmit and sense an inductive signal.

8. A method according to claim 2 in which a light beam is reflected from the surface of the seal face member or component.

9. A method according to claim 8 in which the surface of the seal face member is treated so that its reflectivity varies as the wear limit is approached.

10. A method according to claim 9 in which the gap between the surface of the seal face member and sensor is constant.

11. A method according to claim 10 in which a tapered band of reflective material is provided on the surface of the seal face member, said band covering an increasing circumference of the seal face member or component so that as the seal face member moves axially past the sensor there is a continuous variation in the intensity of light reflected from the surface.

12. A method according to claim 1 in which an electromagnetic sensor is positioned radially of the seal face member or component and a magnetic implant is provided in the seal face member or component, the implant being positioned relative to the sensor such that the signal picked up will be at maximum when the sealing faces are at the wear limit.

13. A mechanical face seal comprising an axially fixed seat and an axially movable seal face member which is urged into sealing engagement with said seat, a sensor is mounted radially of the seal face member or a component which moves axially with the seal face member and means is provided for producing a signal directed radially from the surface of the seal face member or component to the sensor, said surface of the seal face member or component being arranged to produce a change in signal indicative of the wear limit or amount of wear of the sealing faces.

* * * * *

UNITED STATES PATENT AND TRADEMARK OFFICE
CERTIFICATE OF CORRECTION

PATENT NO. : 4,497,493
DATED : February 5, 1985
INVENTOR(S) : SURINDERPAL SINGH SALL et al It is certified that error appears in the above—identified patent and that said Letters Patent is hereby corrected as shown below:

On the title page Item [30] should read

-- [30] FOREIGN APPLICATION PRIORITY DATA

Jul. 20, 1983 [UK] United Kingdom.......8319550 --.

Signed and Sealed this

Second Day of July 1985

[SEAL]

*Attest:*

DONALD J. QUIGG

*Attesting Officer*  *Acting Commissioner of Patents and Trademarks*